(No Model.)

R. DEAN.
APPARATUS FOR DISTILLING OR REDUCING OILS.

No. 305,056. Patented Sept. 16, 1884.

WITNESSES
Geo. F. Downing.
S. G. Nottingham

INVENTOR
Richard Dean.
By H. A. Seymour
ATTORNEY

UNITED STATES PATENT OFFICE.

RICHARD DEAN, OF CLEVELAND, OHIO.

APPARATUS FOR DISTILLING OR REDUCING OILS.

SPECIFICATION forming part of Letters Patent No. 305,056, dated September 16, 1884.

Application filed April 16, 1884. (No model.)

*To all whom it may concern:*

Be it known that I, RICHARD DEAN, of Cleveland, in the county of Cuyahoga and State of Ohio, have invented certain new and useful Improvements in Apparatus and Processes of Distilling or Reducing Oils; and I do hereby declare the following to be a full, clear, and exact description of the invention, such as will enable others skilled in the art to which it appertains to make and use the same.

My invention relates to an improvement in apparatus for distilling or reducing oils.

The subject-matter of this present invention is the modification referred to in my application, bearing the same title as the present, and filed of even date herewith, the object of the same being to provide an apparatus in which the oil shall be more completely subjected to the heat of a furnace and a rapid and continuous vaporization insured, either with or without the presence of free steam, and to further provide for collecting an indefinite number of vapor products, each in a separate suitable condenser.

With these ends in view, my invention consists in a lower and upper series of parallel stills, each lower being connected with its corresponding upper by manifold pipes, either straight or curved, and each upper still connected with its next succeeding lower by one or more oil-conducting pipes.

My invention further consists in certain features of construction and combinations of parts, as will be hereinafter described, and pointed out in the claims.

Figure 1:
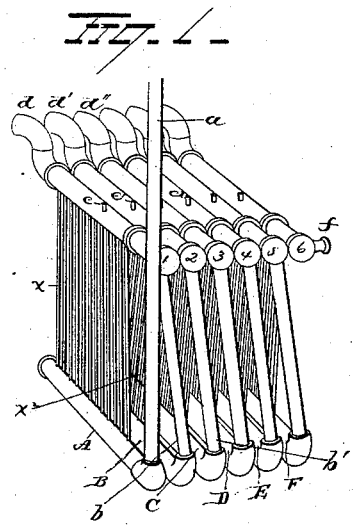
Figure 2:
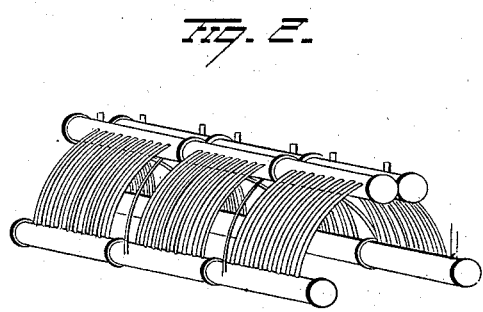

In the accompanying drawings, Figure 1 represents my improved apparatus where the manifold branches or pipes are straight, and Fig. 2 represents a modification where the branches or pipes are curved.

A B C, &c., represent a lower series of stills consisting of parallel horizontal or nearly horizontal pipes, and 1 2 3, &c., represent an upper series of stills situated conveniently above and parallel with the stills A B C, &c., respectively. A feed-pipe, $a$, connects with one end of the still A. The still A is connected with the still 1 by manifold branches or pipes $x$, the still B with the still 2 by the manifold branches $x'$, the still C with the still 3 by the manifold branches $x^2$, &c. The still 1 is also connected with the still B by one or more oil-conducting pipes, $b$, the still 2 with the still C by one or more oil-conducting pipes, $b'$, &c.

The stills 1 2 3, &c., are each provided with a vapor-outlet pipe, $d$ $d'$ $d''$, &c., and with a steam-inlet pipe, $e$ $e'$ $e''$, &c., or not, as may be desired. The last still in the upper series is provided with a residuum-discharge pipe, $f$.

The whole apparatus as thus described is exposed to heat in the combustion-chamber of a furnace. The oil, passing first into the still A, becomes gradually heated as it rises through the manifold branches $x$ and enters the still 1, and the more volatile of the products passes off through the outlet $d$, and is collected in a suitable condenser connected therewith. From the still 1 the oil of a less volatile nature passes down through the oil-conducting pipe or pipes $b$ into the still B, and from thence upward through the manifold branches $x'$ to the upper still, 2, from whence the product of a shade less volatile nature passes off through the outlet-pipe $d'$, and is collected in its own suitable condenser. It will be readily seen that the oil in passing through this apparatus becomes thoroughly exposed to the furnace-heat, being divided into numerous slender columns, and that the products of every shade of specific gravity may be obtained by increasing the number of stills indefinitely.

In the modification represented in Fig. 2 the lower series of stills consists in two lines of pipes placed end to end, the two lines being separated about the width of the combustion-chamber of the furnace, while the manifold branches curve toward one another and connect with the upper series of stills near the top of the combustion-chamber, forming an arch. Each preceding upper still is connected with the succeeding lower still by an oil-conducting pipe, and each upper still is provided with a vapor-outlet pipe and steam-inlet pipe, in a manner wholly similar to that hereinbefore described. A series of furnaces similar to that shown in Fig. 2, each provided with its own double series of lower and upper stills, and the several independent series connected for a continuous flow of oil, may be found very advantageous in many instances, the particular advantage of this latter construction consisting in the arching of the pipes over the furnace, and thus exposing the oil therein to a gradually-increasing heat as it passes from the lower to the upper stills.

In some of the devices heretofore employed for separating the different grades of volatile products the stills have been arranged in an inclined plane and connected by traps, the upper still being provided with an oil-supply pipe and the lower one with a discharge-pipe, and in others a series of stills have been connected by means of pipes to an upper heating-chamber divided into compartments. In the first instance the stills which are connected by pipes starting from near the top of a still and terminating near the bottom of the still next below are liable to be clogged by the residuum settling in the bottom of the stills and choking the connecting-pipes, and preventing the downward flow of oil, while in the other arrangement referred to two or more stills connect with one heating-compartment, and as the stills are subjected to different degrees of temperature it follows that a complete separation of the different grades of volatile products is not accomplished. In my device the stills are heated alike, and each upper still is provided with its independent escape-pipe, and hence it follows that the lightest grades of volatile products will be separated from the oil in the first still, and so on, as the temperature of the oil is increased in the succeeding stills.

It is evident that many slight changes in the relative positions of the several stills and the shapes of the several branches connecting them may be made without departing from the spirit and scope of my invention. Hence I do not wish to limit myself strictly to the construction herein set forth; but, Having fully described my invention, what I claim as new, and desire to secure by Letters Patent, is—

1. In an apparatus for distilling or reducing oils, the combination, with a series of lower stills, of a series of upper stills, each of said upper stills being connected with a corresponding lower still by manifold branches, oil-conducting pipes connecting each upper still with its succeeding lower still, and vapor-outlet pipes connecting the several upper stills with suitable condensers, substantially as set forth.

2. In an apparatus for distilling or reducing oils, the combination, with a series of lower stills consisting of two or more horizontal pipes, and a series of upper stills consisting of two or more horizontal pipes, the upper stills being connected with the lower stills by manifold branches, of oil-conducting pipes connecting each upper still with the succeeding lower still, pipes connecting each upper still with a suitable vapor-condenser, and steam-pipes adapted to discharge free steam into each upper still, substantially as set forth.

3. In an apparatus for distilling or reducing oils, the combination, with a series of lower stills connected by manifold branches with a series of upper stills, each upper still being connected with the next succeeding lower still by an oil-conducting pipe, the whole situated in the combustion-chamber of a furnace, of vapor-condensers connected with the several stills, and pipes for discharging free steam into the several upper stills, substantially as set forth.

4. In an apparatus for distilling or reducing oils, the combination, with a series of lower stills, of a series of upper stills, each of said stills being connected with a corresponding lower still, an oil-conducting pipe connecting each upper still with its succeeding lower still, and vapor-outlet pipes connecting the upper stills with suitable condensers.

In testimony whereof I have signed this specification in the presence of two subscribing witnesses.

RICHARD DEAN.

Witnesses:
JAS. W. STEWART,
THOS. T. JOHNSON.